United States Patent [19]

Willems et al.

[11] Patent Number: 4,891,768

[45] Date of Patent: Jan. 2, 1990

[54] RASTER IMAGE PROCESSOR

[75] Inventors: Theodorus H. M. Willems, Horst; Franciscus H. J. Tunnissen, Venlo, both of Netherlands

[73] Assignee: Oce-Nederland B.V., Venlo, Netherlands

[21] Appl. No.: 912,544

[22] Filed: Sep. 26, 1986

[30] Foreign Application Priority Data

Sep. 27, 1985 [NL] Netherlands ............... 8502642

[51] Int. Cl.⁴ ............................... G06F 15/66
[52] U.S. Cl. .................... 364/518; 364/521; 340/747
[58] Field of Search ............. 364/521, 522, 520, 518; 340/799, 720, 747, 750

[56] References Cited

U.S. PATENT DOCUMENTS

| | | | |
|---|---|---|---|
| 4,031,519 | 6/1977 | Findley | 364/900 |
| 4,246,578 | 1/1981 | Kawasaki et al. | 340/750 |
| 4,300,206 | 11/1981 | Belleson et al. | 364/900 |
| 4,379,327 | 4/1983 | Tietjen et al. | 364/200 |
| 4,396,989 | 8/1983 | Fleming et al. | 364/521 |
| 4,454,593 | 6/1984 | Fleming et al. | 364/900 |
| 4,504,828 | 3/1985 | Coper et al. | 340/735 |
| 4,554,638 | 11/1985 | Iida | 364/521 |
| 4,615,017 | 9/1986 | Finlay et al. | 364/900 |
| 4,639,861 | 1/1987 | Appiano et al. | 364/200 |
| 4,646,259 | 2/1987 | Lincoln et al. | 340/799 |
| 4,722,064 | 1/1988 | Suzuki | 364/518 |
| 4,747,042 | 5/1988 | Ishii et al. | 364/200 |
| 4,755,956 | 7/1988 | Porawski | 364/518 |

FOREIGN PATENT DOCUMENTS 0137147 7/1984 European Pat. Off.
0053503 3/1983 Japan.

OTHER PUBLICATIONS

Craig McKenna et al., "Backup Support Gives VME Bus Powerful Multiprocessing Architecture", Electronic Components and Application, vol. 6, No. 3, 1984, pp. 178-185.
Sproull, R. F., "Using Program Transformations to Derive Line-Drawings Algorithms", ACN Transactions or Graphics, Oct., 1982, pp. 259-273.
Gold et al., "Shift Register System for Image Orientation", IBM Technical Disclosure Bulletin, vol. 18, No. 8, Jan., 1976, pp. 2633-2639.

Primary Examiner—Gary V. Harkcom
Assistant Examiner—Phu K. Nguyen
Attorney, Agent, or Firm—Reed Smith Shaw & McClay

[57] ABSTRACT

Raster image processor for filling a page-size raster image memory and for the conversion of the data stored in the raster image memory into a serial pixel-bit stream for a raster output scanner which includes a microprogrammable central processing unit; a raster image bus interface connected to a synchronous raster image bus system; a raster output scanner interface connected to the raster output scanner; an interface connected to the asynchronous bus system; and a synchronous raster image processor bus system connecting the microprogrammable CPU to the raster image bus interface to the raster output scanner interface, and to the interface which is connected to the asynchronous bus system.

5 Claims, 6 Drawing Sheets

LSM INTERFACE

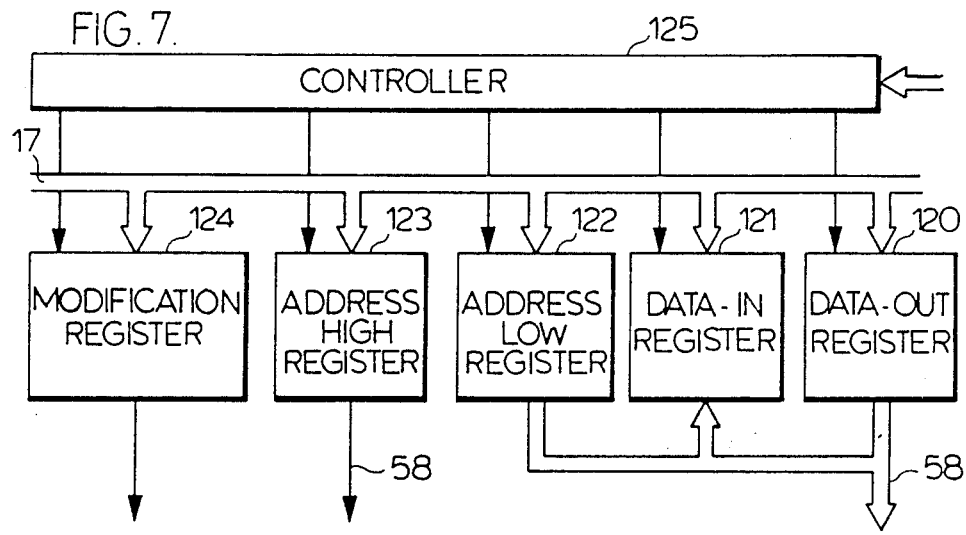
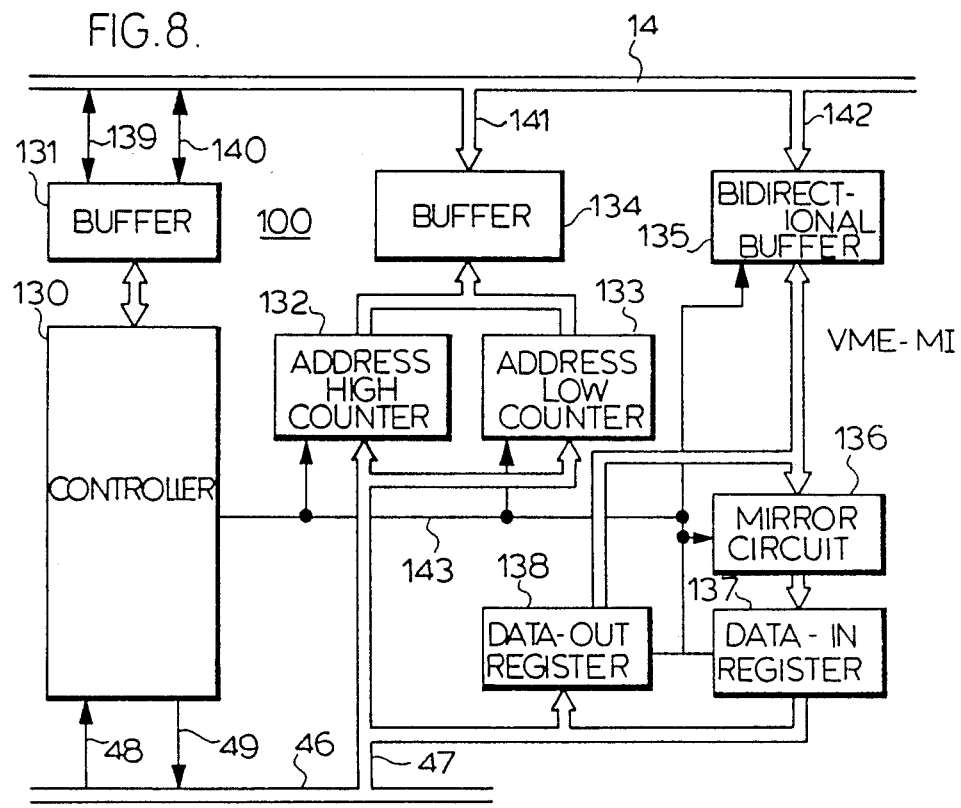

RASTER IMAGE PROCESSOR

FIELD OF THE INVENTION

The present invention relates to a raster image processor for filling and reading out of a page size raster image memory with bit representation of graphical and type characters.

BACKGROUND OF THE INVENTION

Raster image processors are known and used in printers which are capable of printing a line-wise complete page with serially presented data. Typical of these printers is the laser printer in which a light beam is modulated imagewise and deflected line-wise by means of a polygonal mirror onto a light-sensitive surface. The latent image formed on the light-sensitive layer can be developed and transferred to a receiving material such as a sheet of paper.

The graphical data may, for example, be obtained by scanning an image by means of a scanning device and storing the data, with or without the aid of a coding system, in a memory.

The data for a page to be printed is first processed, for example, by means of a graphical work station, to produce a finally desired layout which may contain textual and graphical data.

If an assembled page has to be printed, the graphical information, coded or not coded, and the coded font data are fed to a front-end system along with information relating to height, width and finally desired position. In addition, the bit-map information of the characters to be printed is fed to the front end. This data must then be sent to a printer control. See, for example, U.S. Pat. Nos. 4,031,519; 4,300,206; and European Application No. 0,137,147 A3.

For example, after all the data have been stored in memory in the front end, the raster image processor is adapted to set the data at the correct location in a page size memory (bit-map memory) and to serially read out the page memory to the modulator of a laser printer.

Because modern laser printers are capable of printing pages at high speed and with a high resolution, the raster image processor must be capable of processing the data for said pages at high speed for presentation to the printer. Accordingly, it is an object of the present invention to provide a high speed raster image processor.

SUMMARY OF THE INVENTION

The raster image processor of the present invention is capable of rapidly filling a page-size raster image memory with bit representation of graphical and type characters. These representations are stored as n-bit words in consecutive memory addresses. The stored data is converted into a serial pixel-bit stream for the raster output scanner.

Generally, the raster image processor of the present invention is connected to the raster image memory by a synchronous raster image bus and includes a programmable CPU, a raster image bus interface connected to the synchronous bus and a raster output scanner interface. A synchronous raster image processor bus is provided to connect the CPU to raster image bus interface, and the raster output scanner interface. It also connects to an interface which is connected to the asynchronous bus of the front end. Preferably, this latter interface includes a master interface, a slave interface and an interrupter interface. The master interface includes an address counter and a buffer.

Other advantages of the present invention will become apparent from a perusal of the following detailed description of presently preferred embodiments taken in connection with the accompanying drawings.

BRIEF DESCRIPTION OF THE DRAWINGS

FIG. 7 is a diagrammatic representation of a raster image bus interface;

FIG. 8 is a diagrammatic representation of a VME-master interface of the VME-bus interface;

PRESENTLY PREFERRED EMBODIMENT

Figure 1:
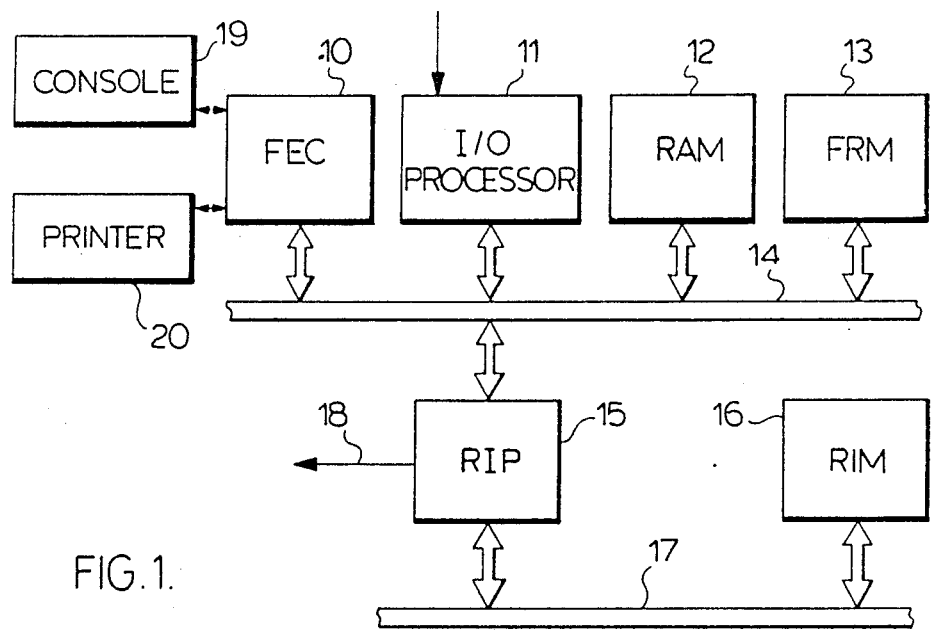
FIG. 1 is a diagrammatical representation of the front-end system according to the invention.

FIG. 1 is a diagrammatic representation of a front-end system. As shown a front-end controller 10 (FEC) is connected to an operating console 19 and also to the control system of a printer 20. Printer 20 is a raster output scanner in which a light beam is modulated image-wise and is deflected line-wise over the surface of a light-sensitive element. The light-sensitive element is driven perpendicular to the direction of deflection of the light beam in order for it to be possible to write a complete image in raster form. An example of a raster output scanner is a laser printer in which a modulated laser beam is driven by means of a rotating multiface mirror over the surface of a charged photoconductor. The photoconductor is exposed image-wise in this process, and the charged image obtained can be developed in a known manner with toner, then transferred to a receiving sheet and fixed by means of heat.

Front-end controller 10 preferably contains a 16-bit microprocessor system embodying, for example, a Motorola 68000 microprocessor and functions in combination with local ROM and a part of a random access memory 12 (RAM) as the control system for the front end. In font read memory 13 are stored the bit patterns of a number of print types. The front end may be connected via an I/O processor 11, which also contains a 16-bit microprocessor system embodying a Motorola 68000 microprocessor, to a disc memory, work station, computer or cluster controller. The FEC 10, I/O processor 11, RAM 12 and font memory 13 are connected to each other via a standard VME bus 14. The font memory 13 can also be constructed as a RAM or form part of RAM 12. The bit patterns of the fonts are then loaded into said RAM from a disc memory or floppy-disc memory.

A raster image processor 15 (RIP) is also connected to VME bus 14. In addition, raster image processor 15 is connected via a raster image bus 17 (RI bus) to a page-size bit-map memory 16, also termed raster image memory (RIM). RIP 15 serves to fill the bit-map memory 16 (RIM) image-wise with type characters that are called up from font memory 13 and deposited in the correct location in bit-map memory 16. In addition, RIP 15 can call up graphical information from memory 12 and also set it aside at the desired locations in bit-map memory 16. If the bit-map memory has been filled, it can be read out again via RIP 15, the data read out being fed as a serial pixel-bit stream via line 18 to the modulator of the laser printer.

The image which is written on the photoconductor is made up of pixels preferably having a size of 0.05×0.05 mm so that approximately 4,000×6,000 pixels are necessary to print an A4-format black/white image. Consequently, bit-map memory 16 is preferably approximately 24 megabits or 3 megabytes. During read out of bit-map memory 16, the pixel bit rate to the modulator of the laser printer via line 18 is approximately 25 megapixels/sec, resulting in the printing of an A4-format page in approximately 1 sec.

All data relating to a page to be printed are stored in RAM 12 via I/O processor 11 from, for example, a work station and under the control of FEC 10. For this purpose various options are available, for example, an A4-page, which has to be printed in the "portrait mode". Approximately 4,000 subtables are made corresponding to the approximately 4,000 scan lines which are necessary to write a page. In each subtable, type codes of the type characters or graphical characters are stored which have their starting point on a certain scan line. Each type code contains, in addition, data relating to the X position which the character assumes on the scan line, data relating to the font type and also data relating to the height and width of a certain character. The type code also contains data relating to a base address in the font memory 13, where the bit representation of said character is stored in 16-bit words. The set of lists thus formed is termed the list of primitives.

Once the data relating to a page to be printed have thus been stored in RAM 12, filling bit-map memory 16 can be started. For this purpose the letter codes are called up from RAM 12 one by one by RIP 15 and, together with the associated bit representation from the font memory 13, expanded and deposited at the correct X and Y locations in bit-map memory 16. In a corresponding manner all characters are completed one by one until bit-map memory 16 is completely filled with the pixel representation of the page to be printed.

It is not necessary to form sublists. The data relating to a page to be printed can also be stored in the RAM 12 in a random sequence. During the filling of bit-map memory 16, RAM 12, in which the primitives are placed in a random sequence, is successively read out, expanded, and placed at the respective locations in bit-map memory 16.

In a preferred embodiment all of the characters occurring on a page are stored only once and provided with data relating to the various positions which each character assumes on the page. In this manner, the data relating to a frequently occurring character such as, for example, the letter "e", are only stored once in RAM 12 and all the positions which this letter assumes on the page are inserted in a separate table.

Usually first the graphical characters which are stored in RAM 12 or font memory 13 are placed in bit-map memory 16 and only thereafter the type characters.

The Raster Image Processor

Figure 2:
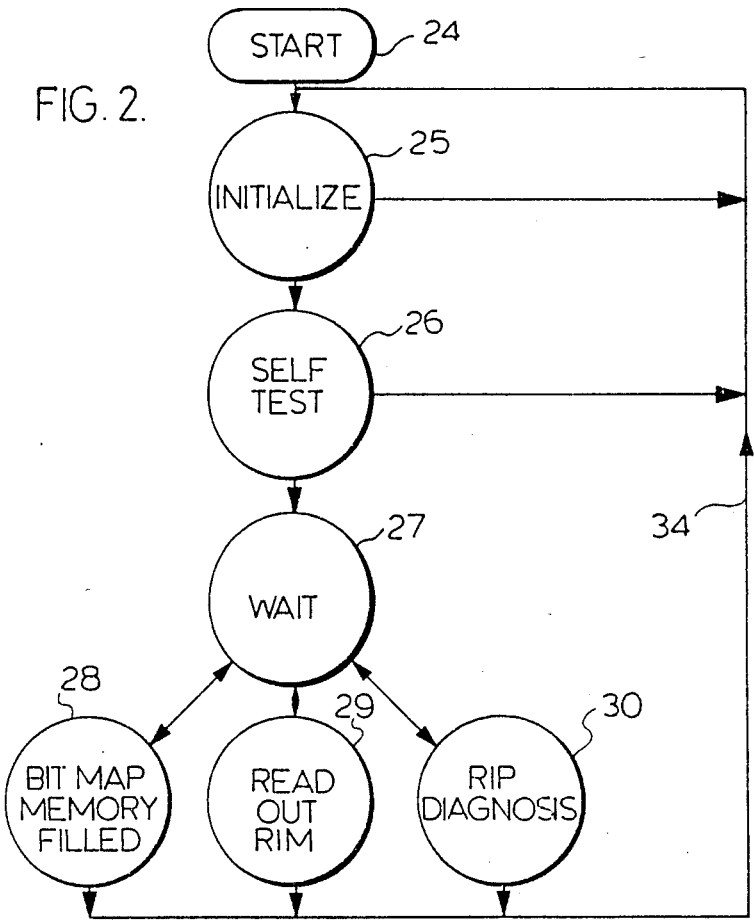
FIG. 2 represents the processes which can be performed by the raster image processor.

Referring to FIG. 2, the processes carried out by the raster image processor 15 are shown schematically (RIP). After starting up the system (Step 24), RIP 15 is initiated (Step 25) (INIT command) by a system reset or an INIT command from front-end controller 10. A "self test" process (Step 26) is started which comprises the testing of various RIP functions and bit-map memory (RIM) functions. RIP 15 must not have access to VME bus 14 during the self-test procedure, because the FEC 10 requires the VME bus 14 for the testing of RAM 12 and font memory 13. If RIP 15 successfully carries out the "self-test" program, an interrupt signal is transmitted to FEC 10 and RIP 15 goes into the wait mode (Step 27). If the self-test program has detected a fault, RIP 15 also goes into the wait mode (Step 27), but no interrupt signal is generated for the FEC 10. In this manner front-end controller 10 knows that a fault has been diagnosed in the RIP 15 "self test". A fault is also indicated to the operator by a LED lighting up.

On an "RIP diagnosis" command from FEC 10 to RIP 15, RIP 15 diagnosis process 30 starts. The RIP 15 performs a number of internal tests and also a number of tests on RIM 16. The results of these tests are stored in RAM 12 and can be transmitted to, and made visible on, operating console 19. The RIP diagnosis process also tests the VME interfaces. The RIP diagnosis process has a more extensive character while the self-test process performs a more functional hardware test. After the termination of the RIP diagnosis process, RIP 15 stores status information in RAM 12, generates an interrupt signal for FEC 10, and unblocks VME bus 14.

After RIP 15 has received a "fill bit map" command from FEC 10, RIP 15 checks the data transfer on VME bus 14. RIP 15 thus acquires access to RAM 12, which contains the primitives of the page which has to be printed.

RIP 15 expands the list of primitives by means of the pixel representations of the fonts and deposits these in bit-map memory 16 (RIM). RIP 15 has access to RIM 16 via RI bus 17. RIM 16 contains, in addition, modification logics which supports RIP 15 in performing various arithmetical operations on data for bit-map memory 16 such as, for example, AND, OR and INVERT operations. After the bit map has been filled (Step 28), RIP 15 stores status information in RAM 12, generates an interrupt signal for FEC 10, and unblocks VME bus 14.

FEC 10 then generates a "read bit map" command and RIP 15 waits for a page synchronization signal which originates from the laser printer via a control interface. After the page synchronization is generated, RIP 15 starts by reading out RIM 16 (Step 29) and generates a serial pixel bit stream which is fed to the modulator of the laser printer via a video interface. After the termination of the bit-map reading process (step 29), RIP 15 again stores status data in RAM 12, generates an interrupt signal for FEC 10, and then unblocks VME bus 14.

Figure 3:
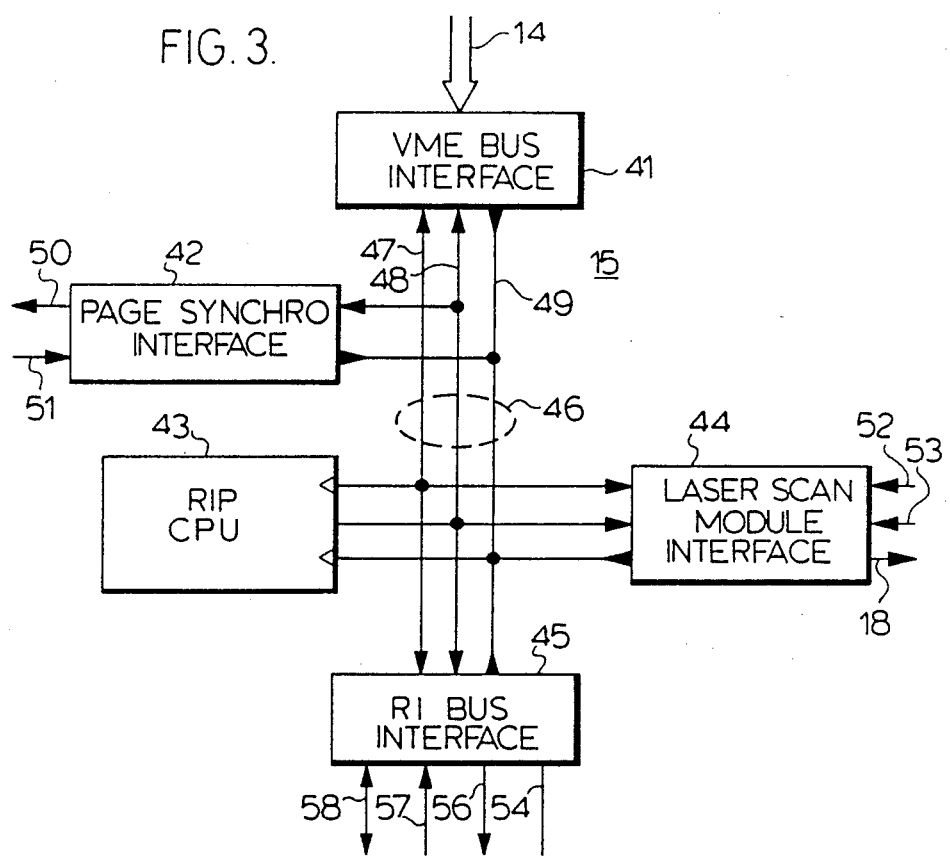
FIG. 3 is a diagrammatic representation of a raster image processor.

With reference to FIG. 3, RIP 15 preferably includes an internal bus system having raster image processor bus 46 (RIP bus) which is a synchronous bus designed to exclusively transfer 16-bit words. RIP bus 46 contains data lines 47, address and control lines 48 and condition lines 49. The RIP bus is connected via a VME bus interface 41 to VME bus 14, and, via an RI bus interface 45, to RI bus 17. RI bus 17 contains, inter alia, data and address lines 58, a busy line 57, an RI bus address available line 56, a clock line 54, and modification lines. In addition, RIP bus 46 is connected to a laser scan module interface 44 (LSM interface) and the central processing unit 43 (CPU) of RIP 15. The laser scan module LSM interface 44 is connected to lines originating from the printer. For example, "start-of-scan" line 52 (SOS), by which a synchronization signal is supplied to indicate the beginning of a line to be printed, a burst line 53, by which a signal is supplied which corresponds to the desired pixel frequency, and a video line 18, by which the serial pixel bit stream is fed to the modulator from the laser printer on reading out bit-map memory 16. The address and control lines 48 and the condition lines 49 are also further connected to a page synchronization interface 42. A "page-available" signal (PAV) is fed to the control device of the printer via line 50. This signal indicates that a page is fully formatted in bit-map memory 16 and that RIP 15 can start reading out bit-map memory 16 on receiving a "start-of-page" signal (SOP) via line 51 which is derived from the control device of the printer.

VME-Bus Interface

Figure 4:
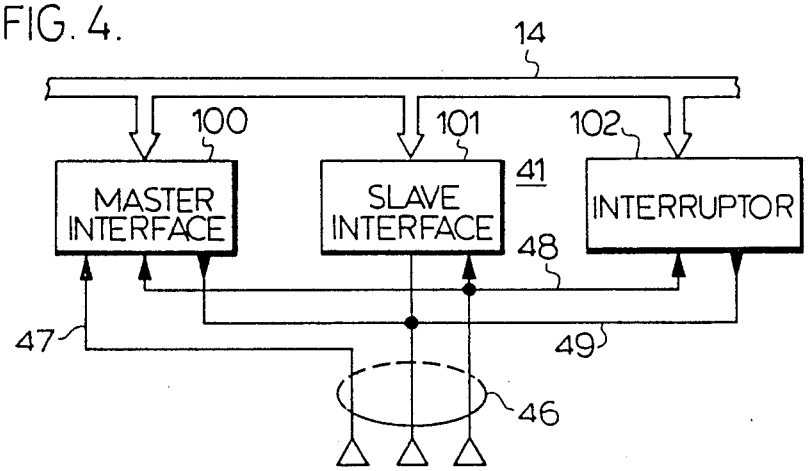
FIG. 4 is a diagrammatic representation of a VME-bus interface.

Referring to FIG. 4, VME-bus interface 41 is diagrammatically represented in detail. A master interface 100, a slave interface 101, and an interrupter 102 are connected to VME bus 14. Data lines 47 from RIP bus 46 are connected to master interface 100. The address and control lines 48 are connected, as are the condition lines 49 from RIP bus 46, to master interface 100, slave interface 101, and interrupter 102. The task of the VME-bus interface 41 is to shield RIP 15 from the asynchronous VME bus 14. The VME master interface 100 (VME-MI) contains an internal control system by means of which the buffers and registers present are controlled. This interface permits access cycles to be performed on the VME bus 14. In the control system, programmable logic is used. For the control of slave interface 101 and interrupter 102 preferably programmable logic is provided.

With reference to FIG. 8, VME-MI 100 also comprises data transfer functions. These functions include data base-master (DTB-master) and data base-requester (DTB-requester). To achieve the desired speed in the data transfer VME-MI 100 includes additional functions.

The first function is an address up/down counter formed by an address high counter 132 and an address low counter 133. During the loading of RIM 16 with the bit representations of the various type characters or graphical characters which are each stored separately with consecutive addresses in font memory 13 or RAM 12, counters 132 and 133 are preset for each character with the base address of said character in, for example, RAM 12. Via buffer 134 and the VME address bus 141 of VME bus 14 the base address is supplied to RAM 12, and the first 16-bit word at the respective memory location is supplied via VME data bus 142 of VME bus 14 to a bidirectional buffer 135 and then placed at the correct location in RIM 16. The subsequent address for RAM 12 is generated by increasing counter 133 by 1 and the second 16-bit word is supplied to RIM 16 by VME-MI 100. In a corresponding manner all of the addresses associated with a given character are generated until such time as that character has been completely written into RIM 16.

In this manner CPU 43 needs to generate a base address only once per character so that during loading other functions can be performed, for example pixel processing operations, RIM address determination, and the like.

After a character has been finished, a new base address for a subsequent character is fed to counters 132 and 133 and the cycle described above is repeated.

The second function, the mirror function, is performed with a mirror circuit 136 which is constructed with programmable logic such as FPLAs or PALs and which can be used if characters have to be set rotated through 180° in RIM 16. Mirror circuit 136 interchanges bit 0 of a 16 bit word with bit 15, bit 1 with bit 14, bit 2 with bit 13, etc.

The CPU 43 does not now generate the base address, but calculates, from data relating to the length and width and base address of a character, the highest occurring address for said given character in RAM 12. This highest address is loaded into counters 132 and 133 while the counters are also switched over to down-counters by VME-MI controller 130. After each memory access of RAM 12 the content of counter 133 is reduced by 1 and the 16-bit words from RAM 12 are mirrored in mirror circuit 136 and placed in the RIM 16 via data-in register 137. These cycles are continued until the original base address of the character is reached. In VME-MI 100, a data-out register 138 is also connected via data lines 47 to RIP bus 46 in order to feed data in this manner to, for example, FEC 10 or to RAM 12.

VME-MI controller 130 is connected via control lines 48 and condition lines 49 to RIP bus 46 and, in addition, via buffer 131 to address, data and control lines 139 and bus arbitration lines 140 of VME bus 14.

CPU 43 can call up various modes in VME-MI 100, such as "release bus", "multiple access", "single access" and "change". Before VME-MI 100 can switch to the single-or multiple-access mode, the following data must first also be specified: read or write, normal or mirrored, the desired address and the data to be processed. These specifications can only be altered during the "release bus" mode and during "change" mode. However, the data to be processed always may be changed. This is indicated by a "CHANGE ACKNOWLEDGE" line. The register which contains the read data from VME bus 14 can always be read out if a "REGISTER FULL" line is active.

After calling up a "release bus" mode, VME-MI 100 will unblock VME bus 14. This means that the VME-bus drivers are disabled and a BUSY signal from the VME bus is rendered inactive. The unblocking of VME bus 14 can only take place if the last access cycle is completely finished. A "CHANGE ACKNOWLEDGE" signal indicates that the "release bus" mode is established. In this mode of the interface no access to VME bus 14 can take place. After a "change" request, VME-MI 100 is instructed to seize VME bus 14 if this was not yet the case. This is achieved with the bus arbitration lines 140. The assumption of the "Change" mode is indicated via the "CHANGE ACKNOWLEDGE" line. Access to VME bus 14 can then take place. The contents of the address and data registers also can be changed in the "change" mode. The "change" mode provides a possibility to stop accesses to the VME bus temporarily without the VME bus being unblocked. A single access to the VME bus can be initiated by calling up a "single cycle" mode. If the preceding mode was a "release bus" mode the VME bus is only seized via a corresponding active signal from the arbitration logic. Thereafter only a word access to the VME bus can be performed.

A read/write indicator decides whether a read or write cycle has to be performed. A read cycle means that data from VME bus 14 is clocked into data-in register 137 via mirror circuit 136. Circuit 136 can be activated by means of a normal/mirrored indicator. When data is being clocked into data-in register 137, a REGISTER-FULL flag is set to indicate to CPU 43 that the transfer of data is complete and that the data have entered the register. The REGISTER-FULL flag is set at the instant at which the data is read into data-in register 137, and after this access the content of the address counter is increased by 1. If a mirror function has been enabled, the content of the address counter is decreased by 1. If the REGISTER-FULL flag is still activated and data is being read from the VME-bus, the normal VME cycle is prolonged until the data-in register has been completely read out and new data have been read into data-in register 137.

A write cycle is in principle the same as a read cycle. The only difference is the direction of the data stream. In a write cycle the data which are in data-out register 138 are transferred to VME bus 14. Mirror circuit 136 does not alter anything in the written data. The data-in register 137 must already have been read for it to be possible to clear the REGISTER-FULL flag.

The "multiple-access" mode exhibits many similarities to the "single-access" mode. A "single-access" mode is intended for the reading and writing of commands from, and status information to, the FEC. A "multiple-access" mode is primarily intended for reading graphical and font data, a subsequent access being automatically initiated by VME-MI 100. The new address is generated by the address counter. The only action which has to be performed in this case is the reading of data-in register 137.

The various modes described above are selected with the VME-MODE lines which are connected to some of the signal lines of CPU 43. The read/write selector and the normal/mirrored selector are also connected to such signal lines. The CHANGE-ACKNOWLEDGE and VME register-full signals originate from the WAIT lines of CPU 43. The VME address is stored in 24-bit counters 132 and 133, the input and output data in two 16-bit registers 137 and 138. "Address-high" and "address-low" counters 132 and 133 and the data-out register 138 are loaded by means of register clock lines. The data-in register 137 can be read by means of a register enable line originating from CPU 43.

The LSM Interface

Figure 5:
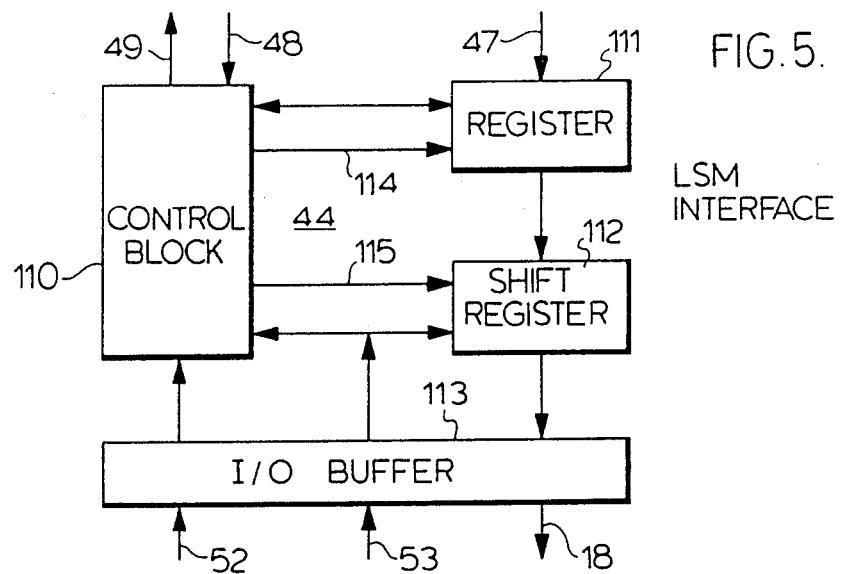
FIG. 5 is a diagrammatic representation of a laser scan module interface.

In FIG. 5, the LSM interface 44 is diagrammatically represented. Upon reading out RIM 16, RIP 15 fetches a 16-bit word from memory and transmits it via data lines 47 of RIP bus 46 to register 111. Control block 110 sends a "load" signal via line 115 to shift register 112 and the content of register 111 is loaded in parallel into the shift register 112. The laser printer emits burst pulses with a frequency of approximately 24 MHz which are supplied via line 53 and I/O buffer 113 to shift register 112 and control block 110. The contents of the shift register 112 is serially shifted out by means of said pulses and is supplied via I/O buffer 113 via line 18 to the modulator of the ROS.

The burst pulses are supplied to a 16 counter in control block 110 so that once 15 pulses have been counted or during the 16th counting pulse, a word which has now been freshly set in register 111 is transmitted in parallel to shift register 112 and shifted out. Before the shifting-out operation of the 16-bit word is started, however, register 111 is loaded with a new 16 bit-word. An "EMPTY" flag is set once data have been set in the shift register 112 and new data can be written into the register 111. The "EMPTY" flag is connected to a "wait line" of the CPU 43 of the RIP 15. In this manner a whole scan line is transmitted in sequence to the ROS. The control block 110 emits condition signals to the CPU 43 via condition lines 49 of the RIP bus 46. After a scan line has been completed and before a SOS signal is supplied via line 52 from the ROS to control block 110, the fetching of data from RIM 16 is briefly suspended by RIP 15.(wait condition). During this time the register 111 is cleared via line 114. In response to the SOS signal the cycle of filling register 111, transmission to shift register 112, shifting out etc., described earlier is repeated again for a subsequent scan line. After the loading of a word into register 111 the "full" status is likewise transmitted via condition lines 49 to CPU 43, the latter delaying the fetching up of a new word until the content of register 111 has again been loaded into shift register 112. After a PAV signal the number of SOS pulses is counted by means of a counter in CPU 43, and by this means it is possible to ascertain when a page has been transmitted completely to the ROS.

The Central Processing Unit

Figure 6:
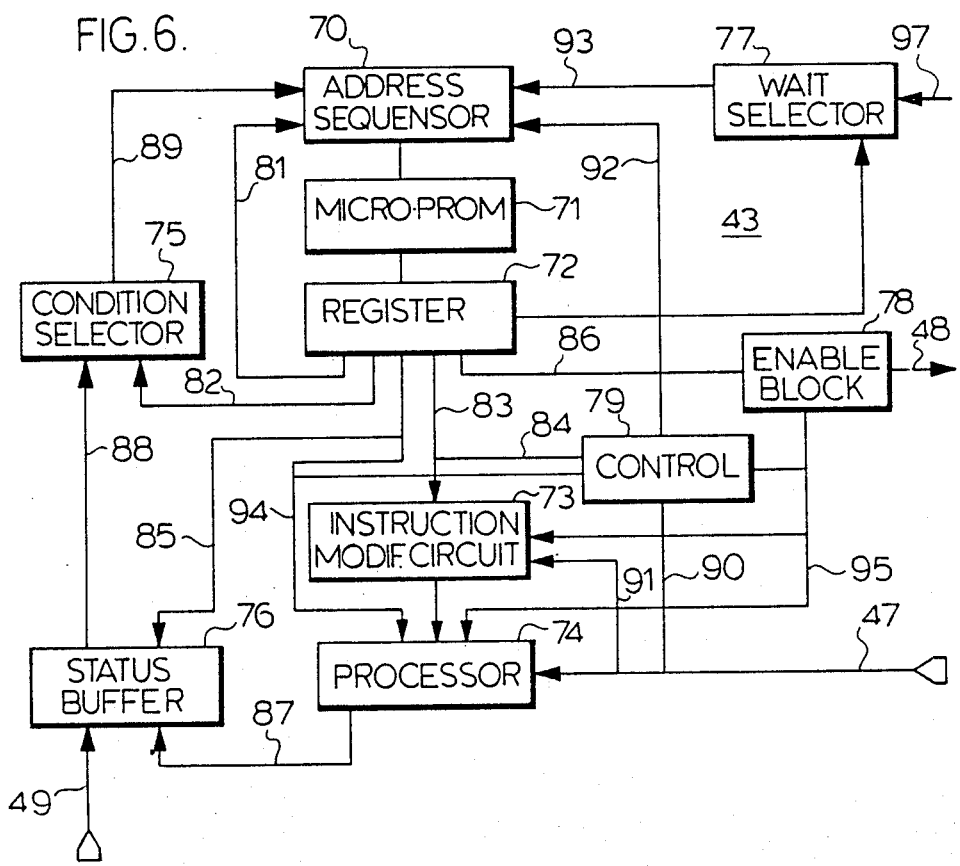
FIG. 6 is a diagrammatic representation of a central processing unit of the raster image processor.

Referring to FIG. 6, CPU 43 of RIP 15 is built around a microprogrammable microprocessor, processor 74, such as a type Am29116, and an associated address sequencer 70, such as a type 2910A, both manufactured by Advanced Micro Devices.

In response to each clock cycle the microinstruction which has to be performed is set in the microinstruction register 72. Said microinstruction originates from micro-PROM 71 and the latter is again addressed by means of the address sequencer 70. In processor 74 every function is controlled by some of the microinstruction bits. The microinstructions can be divided into bits for address sequencer 70, processor 74, branch-address control unit 79, condition selector 75, wait selector 77, and enable block 78.

The sequence in which the microinstructions stored in the micro-PROM 71 are performed is likewise controlled by address sequencer 70. In addition to the possibility of consecutive access to the addresses, conditional branch instructions to every microinstruction in the 4096-size microword area of micro-PROM 71 can be carried out. A LIFO stack provides return-coupling and loop-in possibilities in a microsubroutine. The stack is nine steps deep. For each microinstruction the address sequencer 70 provides a 12-bit address which is initiated from one of the four following sources:

The microprogram address register (PC), which usually indicates an address by an address increase of 1 with respect to the address being handled. However, if a "wait" mode is generated by wait selector 77, the PC is not increased.

An external input connected to lines 92 which obtains its data from the branch address control unit 79.

A nine-step deep LIFO stack which is loaded with the content of the microprogram address register (PC) during a preceding microinstruction.

A register/counter which retains the data which have been loaded from an external input during a preceding microinstruction.

Processor 74 is a microprogrammable 16-bit microprocessor, preferably a type Am 29116, with an instruction set which is optimized for graphical applications. The instruction set for processor 74 comprises, in particular, single and double operand, rotate n bits and rotate and merge.

Processor 74 receives its instructions for performing an operation from the microinstruction register via bus 83 and an instruction-modification circuit 73.

The instruction input is also used as data-input for "immediate" instructions. If the "instruction-enable" (IEN) input of the processor 74 is activated via line 94, the results of the instruction performed are retained in the accumulator and the status register in the processor 74. If an "output enable" (OE) is activated via line 95, the data lines of the CPU 43 are switched as outputs and they contain the content of the ALU of processor 74. Conversely, if the "output enable" is rendered inactive via line 95, the databus of CPU 43 functions as a 16-bit input, and data which are present on the RIP bus can be supplied via data lines 47 to processor 74. Data can then be retained in an internal register. The data bus of processor 74 is connected directly to the data lines 47 of the RIP bus.

The status of the ALU (for example, carry, negative, zero, overflow) is available on the "status bus" 87 of processor 74 during each cycle. Instruction-modification circuit 73 makes it possible to adapt the instructions recorded in micro-PROM 71 to indicate in the case of instructions such as, for example, "rotate n bits", the number of bits with which rotation has to be performed. This number of bits is then specified via a number of lines (91) from processor data lines 47.

If an IEN signal on line 94 renders the instruction input of processor 74 inactive, the same processor instruction bits which are supplied to processor 74 on bus 83 can be supplied via bus 84 also to the branch address control unit 79 and be used to cause address sequencer 70 to branch to a randomly different address. Normally unit 79 receives its branch address from the content of a register which is filled with data from data lines 47 via bus 90.

The condition selector 75 incorporates a one-out-of eight multiplexer, and the output thereof is connected via line 89 to address sequencer 70. One of the eight possible conditions which are applied from condition lines 49 of the RIP bus or from the processor status lines 87 via status buffer 76 and lines 88 to the input of condition selector 75 can be selected. The selected condition is used by address sequencer 70 to perform the desired conditional instruction. Any new conditions can be loaded into status buffer 76 by supplying a selection-enable signal (SLE) via lines 85 to status buffer 76.

The "wait selector" 77 also incorporates a one-out-of-eight multiplexer which, in the active mode, connects one of the eight "wait" lines 97 via line 93 to address sequencer 70. A zero level on a wait line stops the program counter of the program address register. The wait lines are connected to the condition lines of the RIP bus.

The enable block 78 have various functions and generates, in addition, all the signals which are necessary for the control lines on the RIP bus. It performs three different functions:

a. The generation of "enable signals".

The enable signals determine which of the data registers which are connected by their outputs to the RIP bus have to be activated. For each register there is one enable line.

b. The generation of register clocks.

The clock lines determine which data registers which are connected by their inputs to the RIP bus have to clock in data. There is one clock line present for each register.

c. The generation of other signals.

The signals on the signal lines are used as flags and function selectors in the interface modules which are connected to the RIP bus.

Raster Image Bus Interface

The connection between RIP bus 46 and RI bus 17 is formed by the RI bus interface 45 shown in FIG. 7. Interface 45 buffers the bidirectional data, the addresses to be called up and the modification code. The buffering is performed by means of various registers, including "data-out" register 120, "address-low" register 122, "address-high" register 123, and modification register 124. These registers can be loaded from RIP bus 46. The loading takes place under the control of address and control lines 48 of the enable block 78 of CPU 43. The "data-in" register 121 can be read out under the guidance of control by means of an enable line of enable block 78. The "address-high" register 123 contains the most significant bits of the address. The "address-low" register 122 contains the least significant bits. After the loading of "address-high" register 123 the RI-bus read/write cycle is automatically started. This means that the following processes are carried out by controller 125:

Cycle 1 - sets an address on the RI bus and activates RAV (RI-bus address valid), Cycle 2 - sets data-out on the RI bus and inactivates RAV, and Cycle 3 - reads the data on the RI bus into the "data-in" register 121. Before the starting of an RI-bus cycle, CPU 43 has to test whether the RI-bus busy line 57 is inactive. A busy line 57 is connected to one of the wait lines of CPU 43.

The Raster Image Bus (RI Bus)

RI bus 17 connects RIP 15 to bit-map memory 16 (RIM) and is made up of 64 lines. It comprises a 32-bit wide multiplexed address/data bus. RIP 15 acts on RI bus 17 as a master. The RIM 16, which comprises one or more RIM boards, does not itself take any initiative on the bus. In addition, RI-bus DMA devices which can submit a request to the RIP 15 to obtain control over the bus can be connected to RI bus 17.

RI bus 17 is a synchronous bus. A clock signal (BCLK) is presented to the RI bus by RIP 15. All of the actions on the bus are performed at the edges of the biphase clock. Thus, all of the actions of the RIP take place on the rising edge, and all the actions of the RIM on the falling edge of the clock signal (BCLK). The other modes on RI bus 17 can be described by means of three signal levels, high, low and high-impedance (tri-state). All of the alterations in signal levels take place after they have been initiated by an active edge of the biphase clock. There are thus three groups of signals: the clock signals, the address/data signals, and the remaining signals. The signals which occur on the bus are:

(a) BCLK: a symmetrical clock pulse which is presented to the RI bus by the RIP.

(b) RAD 00 . . . RAD 31 (RIP address/data lines): a multiplexed address/data way which is driven by all of the bus devices with tristate drivers. All of the lines are active when "high".

(c) RBR 0, RBR 1 (RI-bus bus request): with these open-collector signals two DMA devices can request the bus arbiter for access to the bus. The devices are of 5 different priority.

(d) PROFF (RI-bus refresh-off): a signal indicating that the RIM boards can switch off the refresh to achieve a minimum cycle time. To prevent loss of data, a special addressing sequence is maintained between the RIM boards and the RIP.

(e) RBG (RI-bus bus grant): with this line the bus arbiter indicates that the bus is available to the requesting device with the highest priority.

(f) RBUSY (RI-bus bus busy): with this open-collector signal an addressed RIM board can indicate that the board is unable to process a new bus cycle for a certain time.

(g) RAV (RI-bus address valid): This tristate signal which is active when low indicates that there is a valid address on the RI bus.

(h) RMC 0 ... RMC 3 (RIM modify code): on these lines a code is presented to the RIM board by the RIP or a DMA device. This code specifies the "modify" function which takes place during the logic operation which is performed on the RIM board on the content of the addressed memory word. These signals are also of the tristate type.

The RI bus is constructed with a 32-bit wide data and address way which is multiplexed for RAD 00 ... RAD 31. The allocation of these lines is as follows:

A 24–D 16: in this situation, address lines RA00 ... RA23 are used. The lines RAD 24 ... RAD 31 are then in the "don't care" mode. For data lines RAD00 ... RAD 15 are used. Lines RAD16 ... RAD31 are at that instant in the "don't care" mode. Data transfer thus takes place on the basis of 16-bit words and the addresses are 24 bits wide.

Another option for using the 32 data and address lines is: A24–D16–D16: This situation is the same as the A24-D16 situation as regards the address lines. By adding a second board in the same address space, in which the data flows through the bus via the lines RAD 16 ... RAD31, it is possible for a 32-bit wide databus to be created with two boards which are internally 16 bits wide. On a RIM board it is possible for the section of the address/databus over which the data is transferred to be selected.

By means of the RBRO, RBR1 and RBG signals access to the RI bus is regulated between the RIP and optional DMA devices. This arbitration takes place completely outside RIM 16.

Each cycle on the bus consists of a WRITE/READ cycle. If the bus is free (RBUSY not active), the RIP is able to set an address (ADR[n]) on the bus on lines (RAD00 ... RAD23). This takes place together with the presentation of a RAV-signal and a RI-bus modify code (RM code) via lines RMC00 ... RMC03. After the address the RIP presents its data (DATAO[n]) to the bus on lines (RAD00 ... RAD15).

The RIM board addressed by ADR[n] renders the RBUSY signal active. The RIP then leaves the RI bus in order to give the RIM board addressed by the ADR[n−1] the opportunity to set DATAI[n−1] on the bus so that the RIP is able to read these data in. Two consecutive WRITE/READ cycles are, as it were, pushed into each other as a result of this. This is still further optimized by making the time which the RIP requires to decide whether RBUSY has become inactive coincide with the last processing phase of the RIM board addressed by ADR[n] in the current cycle. This is achieved by the RIM board making RBUSY already inactive before the RIM board is already completely ready but when it is already quite certain that it will be ready when the RIP has been able to confirm this. The first cycle thus contains invalid data and an additional cycle is also necessary to fetch up the final data from the RIM.

In the manner described above, a minimum cycle time is achieved on the bus. "Minimum cycle time" is the timing sequence of bus modes in which a maximum transfer rate is achieved on the bus.

As a result of the refresh of the RIM it may happen that a RIM board is unable to achieve the minimum cycle time. The RIM boards indicate this by means of the RBUSY signal. By extending this RBUSY signal by a certain number of clock cycles (BCLK), the RIP postpones its subsequent access to the memory by an integral number of clock cycles.

A same situation may occur if the RIP has not yet finished a certain task. The RIP indicates this to the bus by postponing the RAV signal by an integral number of clock cycles.

Raster Image Memory

Figure 11:
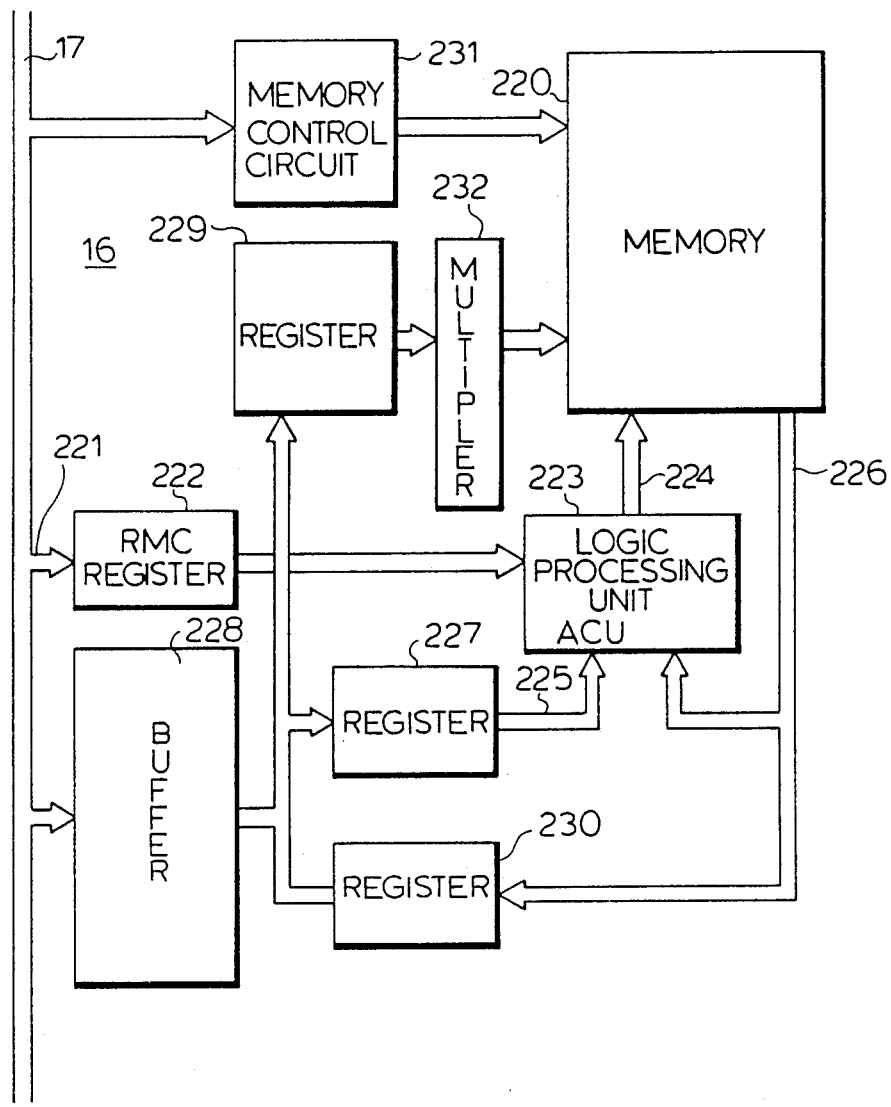
FIG. 11 is a diagrammatic representation of a raster image memory.

RIM 16 shown in FIG. 11 comprises a 24 Mbit dynamic memory 220 organized in 16-bit words which is used as a page-size bit-map memory. Each memory location in the memory 220 corresponds to one precise position on the final printed page. RIM 16 is connected via RI bus 17 to RIP 15 and is filled by RIP 15 with expanded font data and graphical data. An important process which takes place in RIM 16 is the modification process which is performed on an addressed word. The modification process comprises 16 different logic operations which can be applied to the incoming data and the data already present at a certain address. One particular modify function is selected by presenting a RIM modify code to the lines RMC0 ... RMC3 21 of RI bus 17.

The modify code is set in the RMC register 222 and supplied to logic processing unit 223 (ALU) which is made up of programmable logic. The new data (ND) is supplied via DATAO register 227 over data lines 225 to ALU 223 while the old data (OD) already present in the memory 220 is supplied via data output lines 226 to ALU 223. The result of the processing (MD) in ALU 223 is written into the memory 220 via lines 224.

In the table below, some of the modify functions are represented along with the RM codes associated therewith and the corresponding logic functions.

| Modify function | RMC | | | | Logic function |
|---|---|---|---|---|---|
| | 3 | 2 | 1 | 0 | |
| WRITE | 0 | 0 | 0 | 0 | ND |
| PAINT | 0 | 0 | 0 | 1 | ND.OR.OD |
| MASK | 0 | 0 | 1 | 0 | ND.AND.OD |
| ERASE | 0 | 0 | 1 | 1 | ND.AND.OD |
| INVERT | 0 | 1 | 0 | 0 | ND |
| INV. PAINT | 0 | 1 | 0 | 1 | ND.EXOR.OD |
| NOP | 0 | 1 | 1 | 0 | OD |
| CLEAR | 0 | 1 | 1 | 1 | ZERO |
| SET | 1 | X | X | X | ONE |

ND = new data
OD = old data

Because RI bus 17 is a multiplexed bus, the separate addresses and the data are clocked into the registers. For this purpose RI bus 17 is connected to an address- /data bus buffer 228, and when an address is presented to the RI bus 17, it is supplied to address register 229 via buffer 228. When the data is presented (one clock cycle later), the data are stored in the DATO register 227 via buffers 228. The data-in register 230 ("in" for the RIP but "out" for the RIM) is provided to set the data originating from the memory 220, which belongs to the previously presented address, onto RI bus 17.

The control of RIM 16 is provided by memory control circuit 231. Memory control circuit 231 contains a bus state sequencer for starting a number of actions in response to a RAV signal. These actions consist of the clocking in of an address, the clocking in of data associated therewith, the clocking in of the modify code, and the setting of data belonging to the preceding address on RI bus 17. In addition, memory control circuit 231 incorporates a memory state sequencer which is synchronized with the bus state sequencer. The memory state sequencer can be initiated by a refresh request or by a bus cycle for a memory access. If a refresh cycle is performed. The next bus cycle has to be suspended. The circuit 231 employs programmable logic.

Memory 220 is made up preferably of 256 K dynamic memory chips and is organized in six "banks" of 256 K words of 16 bits. Bank selection takes place through decoding the address lines A18, A19 and A20 in address multiplexer 232. The addressing of a memory location in one bank takes place by means of address lines AO-A7 and A16 and the generation of a row address strobe (RAS) from control circuit 231, and address lines A8, A15 and A17 are then supplied to the memory address lines via address multiplexer 232, and a column address strobe (CAS) is also generated by control circuit 231.

Because dynamic memories are used, preferably, all the memory locations of memory 220 undergo a refresh at least once every 4 msec. This is done by periodically adding a "RAS-only" cycle. During this cycle a row address is presented to all the banks. The refresh address in a row is derived by means of a 9-bit counter which is increased by 1 after each refresh cycle.

By activating the RROFF line of RI bus 17 the normal refresh cycle is interrupted and RIP 15 ensures that the minimum cycle time of the next cycle is met. Non-addressed banks of the memory then use the address on RI bus 17 to perform a refresh. On the addressed bank refresh takes place by an access to the selected address.

If only one copy of a page has to be made, the "CLEAR" modify code will be set on RI bus 17 during the reading out of RIM 16 because after reading out RIM 16 must be completely filled with zeros. If the page has to be kept in order to be printed yet once more, the "NOP" modify code will be set on RI bus 17.

Graphical Instructions

The bit-map filler 28 as shown in FIG. 2 is designed to perform various textual graphical instructions such as CHAR, MCHAR, VLINE, HLINE, BLOCK FILL, AREAFILL, LINE and CIRCLE.

All these instructions, which are stored in micro-PROM 71 as shown in FIG. 6, are performed as microinstructions for CPU 43. The algorithms for these instructions are implemented in a manner such that a bit-map filling speed which is as large as possible is obtained.

Figure 9:
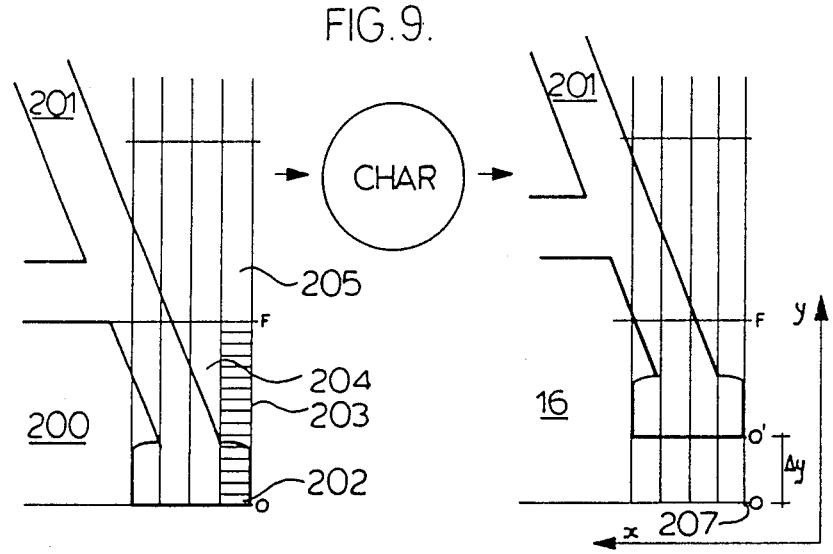
FIG. 9 represents the placing of a character in the bit-map memory.

CHAR is an instruction for placing a character at the correct location in bit-map memory 16. Since the word boundaries of a character generally do not correspond to the word boundaries of the bit-map memory, a displacement is necessary as shown in FIG. 9. In font memory 13 bit-map representation 200 of a character 201 is stored in 16-bit words. A character usually comprises a number of 16-bit words, some of which are indicated by 203, 204 and 205. The corner point 202 of the character 201 is taken here as the reference point as an example, and the first 16-bit word 203 contains 16 bits of which
the first bit is denoted by "0" and the last bit by "F". The bit representation of the first word is thus: 0000 0000 0001 1111.

When this character 201 is placed at the desired y location in bit-map memory 16, word boundary 207 of the bit-map memory will on the whole only rarely coincide with the word boundary 0' of character 201. The operation to be carried out will thus correspond to the displacement of the bit-map representation of character 201 over a number of (n) bits denoted by $\Delta y$ in the Figure.

At the microinstruction level the following steps have to be carried out for this purpose:
Rotate: from bit 0 to bit F over $\Delta y$ (n:=$\Delta y$)
Merge: mask=1 rotate
mask=0 non-rotate MCHAR is an instruction for placing a character in the bit-map memory 16 in mirrored form. The reading out of the bit-map representation of the character by the VME-bus interface takes place in reverse sequence. The displacement of the word boundaries of the character in bit-map memory 16 takes place in an identical manner to that described for CHAR. The circuit for mirroring is also accommodated in the VME-bus interface.

Figure 10:
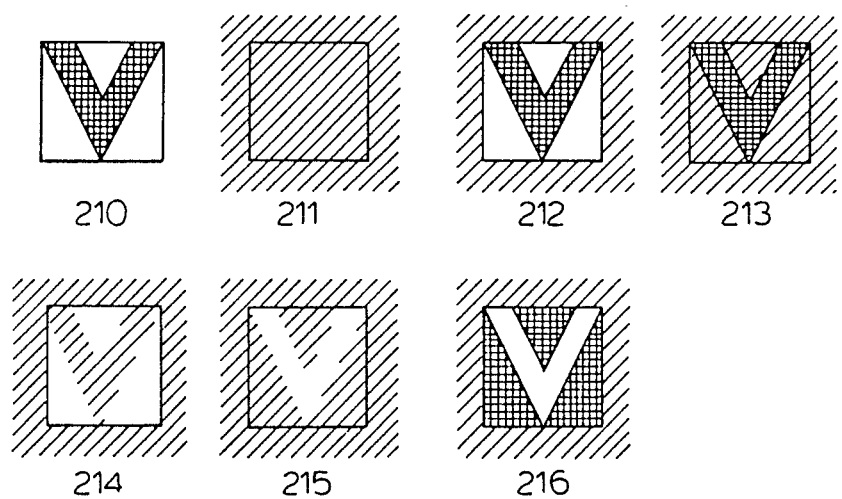
FIG. 10 represents the results of a number of possible operations in the bit-map memory.

For writing characters into bit-map memory 16 the front end has a number of overlay options as shown in FIG. 10. These options are represented diagrammatically in FIG. 10 by reference to a letter "V" (210). Hatching 211 means that the content of the RIM 16 is unaltered. It is assumed that a "0" in the RIM produces "white" and a "1" in the RIM produces "black".

WRITE: the existing content of the RIM 16 is made "0" and the bit-map representation of a character is written with ones (212).

INVERT: the existing content of the RIM is made "1" and the bit-map representation of a character is written with zeros (216).

PAINT: the content of the RIM is not deleted and the ones of the character undergo an "OR" function with the content of the RIM (213).

MASK: the content of the RIM is made "0" at the locations where the character contains zeros, and where the character contains ones the content of the RIM is maintained (214).

ERASE: the content of the RIM is made "0" at the locations where the character contains ones, and where the character contains zeros the content of the RIM is maintained (215).

INVERTING PAINT: the content of the RIM is maintained where the character contains a "0" and where the character contains a "1" the content of the RIM is inverted. A subsequent instruction which the front end can perform is:

BLOCK FILL: the filling of a predetermined area with a regular pattern such as blocks, hatching, etc. The patterns are cyclical and the height to be filled is expressed in complete words, while they are capable of being continued in the X and Y directions.

AREA FILL: the filling up of an area surrounded by lines with a repeating pattern. There are two possibilities, viz. starting from boundaries which are closed in four directions or boundaries which are closed in eight directions. By reading the boundary of the region into the RIM beforehand and as a result of special actions which are described in more detail for the RIM, AREA FILL can be performed in any area even if the boundaries do not correspond to the word boundaries.

To produce lines, circles and arcs of circles use is made of the measuring and regulating methods based on the Bresenham algorithm. In this case the starting point is the theoretical shape of the lines and for each scan line that point is chosen which most closely approaches said desired line. The known algorithm is, for example, described in ACM Transaction on Graphics, Vol. 1, No. 4, Oct. 1982, pages 259-273 by Robert F. Sproull under the title "Using Program Transformations To Derive Line-Drawing Algorithms".

To print open or closed lines or segments of lines which have a width of more than one pixel a special algorithm is used. The starting point is always line segments which are provided with round connecting points by which an ideal matching to other line segments is produced. Starting from the Bresenham circle algorithm a round "plotter point" can be generated with a desired thickness which corresponds to an odd number of raster points. The pixel representation of this "plotter point" is stored in RAM 12 and can thereafter be treated as a character. Like the bit map of a type character, the bit map of a point is characterized by height and width information for the enclosing rectangle, while a corner point of the rectangle forms the reference point which is used to place said point at the correct location in RIM 16.

The starting point of a line segment must form the center point of the "plotter point" and is placed in RIM 16 by using a displacement over half the width and also over half the height of the "plotter point" at the position of the center point, by which the starting point, and consequently also the reference point of the "plotter point" is obtained.

By then continuously calculating the new center point for the "plotter point" by means of the Bresenham line algorithm and by loading the plotter point associated with the location of said center point into RIM 16, a line segment with a certain thickness can be obtained.

The invention is not limited to the embodiment described and many modifications can be conceived by those skilled in the art. However, all these embodiments will fall within the scope of the appended claims.

What is claimed is:

1. In a raster image processor for filling and reading out a page-size raster image memory with bit representations of graphical and type characters using codes of said graphical and type characters which are expanded with said bit representations of each character stored in the form of n-bit words in consecutive addresses in a second memory adapted for input by an asynchronous bus connected to said raster image processor, said processor being adapted for conversion of said data stored in said raster image memory into a serial pixel-bit stream for a raster output scanner to obtain a printed page, the improvement therein comprising a synchronous raster image bus for connecting said processor to said raster image memory; said raster image processor including:
   a. a microprogrammable central processing unit;
   b. a raster image bus interface connected to said synchronous raster image bus;
   c. a raster output scanner interface connected to said raster output scanner;
   d. an VME interface connected to said asynchronous bus; and
   e. a synchronous raster image processor bus connecting said microprogrammable central processing unit (CPU) to said raster image bus interface, to said raster output scanner interface and to said interface which is connected to the asynchronous bus.

2. A raster image processor according to claim 1, wherein said interface which is connected to said asynchronous bus comprises a master interface, a slave interface, and an interrupter interface.

3. A raster image processor according to claim 2, wherein said master interface of said interface comprises:
   a. an address counter connected to said central processing unit and adapted to be loaded thereby with a start address or end address of a character in said second memory;
   b. a buffer means for receiving n-bit words associated with said address from said second memory and transmitting said words to said raster image processor bus; and
   c. a settable counter for increasing or decreasing the address counter by one after each transmission of an n-bit word, said counter being set with the data relating to the number of n-bit words which the character comprises in said second memory.

4. A raster image processor according to claim 3, including a VME-MI controller and a mirror circuit connected between said buffer means and to said raster image processor bus wherein said mirror circuit mirrors the separate bits in the n-bit words as follows: bit 0 by bit n, bit 1 by bit n-1 . . . bit n by bit 0; and whereby said VME-MI controller decreases the content of said address counter one after each transmission.

5. A raster image processor according to claims 1, 2, 3, or 4, wherein said raster output scanner interface comprises:
   a. a first n-bit parallel-in serial-out shift register connected to the output of a second register, the output of said shift register being connected to a video input of said raster output scanner; and
   b. a control circuit connected to said first and second registers and to said raster output scanner for receiving burst pulses, said control circuit comprising an n-bit counter.

* * * * *